United States Patent [19]
Nock et al.

[11] Patent Number: 5,147,478
[45] Date of Patent: Sep. 15, 1992

[54] TIRE TREAD PATTERN HAVING TRANSVERSE GROOVES WITH INTERLOCKING NOISE BAFFLES

[75] Inventors: Nigel G. Nock, Birmingham; David H. Clarke, Walsall; John Martin, Coldfield, all of Great Britain

[73] Assignee: Sumitomo Rubber Industries, Ltd., Hyogo, Japan

[21] Appl. No.: 500,121

[22] Filed: Mar. 28, 1990

[30] Foreign Application Priority Data

Apr. 1, 1989 [GB] United Kingdom ................. 8907400

[51] Int. Cl.$^5$ ............................................. B60C 11/11
[52] U.S. Cl. ............................................... 152/209 R
[58] Field of Search .......... 152/209 R, 209 D, DIG. 1

[56] References Cited

U.S. PATENT DOCUMENTS

| | | |
|---|---|---|
| 2,006,197 | 6/1935 | Ewart et al. |
| 2,056,131 | 9/1936 | Brittain ............................ 152/209 R |
| 2,661,041 | 12/1953 | Walsh ............................... 152/209 R |
| 4,122,879 | 10/1978 | Takigawa et al. .............. 152/209 R |
| 4,217,942 | 8/1980 | Takigawa et al. .............. 152/209 R |
| 4,619,300 | 10/1986 | Tokunaga et al. ............. 152/209 R |
| 4,690,189 | 9/1987 | Bradisse et al. ................ 152/209 R |

FOREIGN PATENT DOCUMENTS

| | | |
|---|---|---|
| 2934522 | 3/1981 | Fed. Rep. of Germany . |
| 1-190505 | 7/1989 | Japan . |
| 2008043 | 5/1979 | United Kingdom . |

*Primary Examiner*—Geoffrey L. Knable
*Attorney, Agent, or Firm*—Birch, Stewart, Kolasch & Birch

[57] ABSTRACT

A tire tread pattern comprising a central zone and two edge zones in which the edge zones are subdivided circumferentially of the tire by a series of transverse grooves each having an axially outer end open to the tread edge characterized by in each transverse groove a noise baffle comprising a circumferentially extending rib across the groove and having a height of 25% to 75% of the groove depth. The noise baffle is preferably quite narro so that it does not materially affect the stiffness of the blocks but acts as a noise baffle only. It may be a single baffle or two or more short baffles interlocking to block noise transmission.

4 Claims, 2 Drawing Sheets

TIRE TREAD PATTERN HAVING TRANSVERSE GROOVES WITH INTERLOCKING NOISE BAFFLES

BACKGROUND OF THE INVENTION

The present invention relates to a tire tread pattern particularly suitable for use on a car.

The modern trend in tire tread patterns has been to improve wet grip and overall vehicle response and handling by using many grooves to form the pattern. Patterns often comprise a series of spaced apart blocks formed by circumferentially and transversely extending grooves which provide many ground contacting edges to give the wet grip required. Problems of noise with such tread patterns however occur and there are many approaches to reducing this noise, including for example, to vary the block size and arrangement around the tire to try and make the noise into white noise rather than predominant frequencies which can cause annoying noise in the vehicle.

Despite all attempts however car tire tread patterns having good wet grip tend to be noisy and thus it is an object of the present invention to try to avoid the noise being perceived in the vehicle and outside the vehicle even though the noise itself is generated in the contact patch between the tire and the road.

SUMMARY OF THE INVENTION

According to one aspect of the present invention a tire tread pattern comprises a central zone and two edge zones in which the edge zones are subdivided circumferentially of the tire by a series of transverse grooves each having an axially outer end open to the tread edge, characterised by the fact that in each transverse groove a noise baffle comprising a circumferentially extending rib is provided which extends across the groove and has a height of 25 to 75% of the groove depth.

The noise baffle may be a single continuous rib or two or sometimes three short ribs which project from either side of the groove and interlock so as to form a noise wall or baffle. In this case water is still able to be ejected along the groove.

Preferably the noise baffle has a width measured axially of the tire of 3 to 10 mm. More preferably the baffle width is 3 to 5 mm so that it does not significantly affect the trend block structural stiffness but only affects the noise.

The noise baffle may be positioned anywhere in the edge region but again it is preferred that the distance of the noise baffle from the tread edge is between 2 and 25% and more preferably 2 and 10% of the width of the tread so that the baffles are substantially at the edge of the tread contact zone with the road to again block the tread induced noise most efficiently.

Noise baffles of this type may be used with various tread patterns including patterns having central ribs and blocks in the edge zones but it is particularly advantageous to use such noise baffles with tread patterns comprising blocks in both edge and central regions.

The noise baffles may have various shapes either with sides which extend radially of the tire or with sides which extend at acute angles to the radial direction.

The noise baffles operate to restrict noise escaping from the contact patch while at the same time they are provided to be sufficiently low to allow water to be ejected from the tire sides when using a new tire pattern in wet conditions.

BRIEF DESCRIPTION OF THE DRAWINGS

Furthermore, features of the present invention will become apparent from the following description by way of example only of one embodiment of the invention in conjunction with the attached diagrammatic drawings which.

Figure 1:
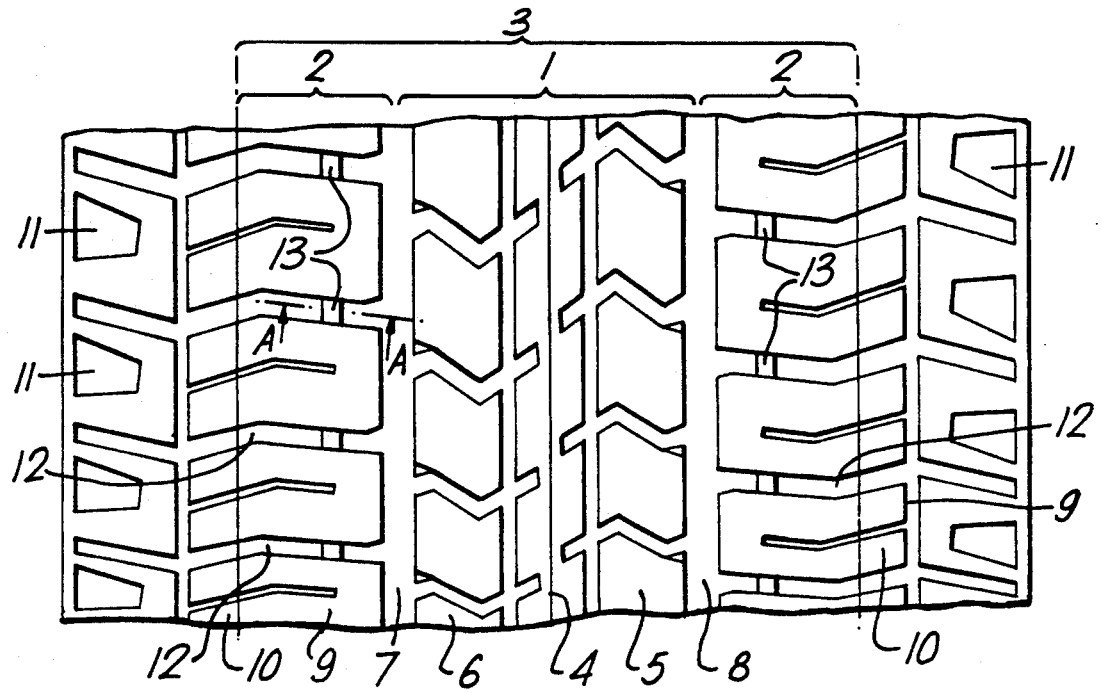
FIG. 1 is a plan view of a section of a block pattern tire tread.

The tire tread pattern shown in FIG. 1. comprises a central zone 1 and an edge zones 2 which extends to the edges of the contact patch 3 which in this case has a width of 125 mm. The pattern in the central region comprises a central rib 4 and two rows 5 and 6 of tread blocks which are sub-divided by grooves in the circumferential and lateral directions as shown. The central zone of the tread 1 is separated from the edge regions by two circumferentially continuous straight grooves 7 and 8.

The edge regions 2 of the tire comprise a series of circumferential spaced blocks of rubber 9 each having a small slit like groove 10 extending to the edge of the blocks. In conventional manner these blocks extend around the profile of the tire away from the ground contacting portion 3 and into a series of rectangular angular sidewall embellishments 11 which complete the visual appearance of the tire. The central region 1 and the tread blocks 9 are the ground contact regions which provide the wet grip and handling performance of the vehicle. The blocks 9 are separated by transversely extending grooves 12 which grooves are open at the edges of the tread so that water expelled from the central portion of the ground contact patch may be expelled through the grooves and out of the contact patch. Each of the circumferential grooves 7 and 8 are positioned a distance of 34 mm inwards from the edge of the contact patch which defines the width of the edge blocks 9.

The grooves 12 are provided with noise baffles 13 one to each groove. In FIG. 1 each noise baffle comprises a narrow projecting rubber ridge member shown in FIGS. 2 and 3 which crosses the groove from block to block and which has a height h measured in the radial direction of the tire which is one-half the groove depth d. The ribs 13 have a width of 5 mm measured transversely of the tire and their side faces 14 extend in substantially the radial direction of the tire. Thus as can be seen in FIG. 3 the ribs or noise baffles 13 blocks the lower regions of each groove 12 but being narrow do not substantially affect the block stiffnesses.

The tread blocks 9 are of otherwise conventional design with their lengths, measured in the circumferential direction varied, and their positions around the tread circumference varied according to the conventional rules for scrambling to reduce tire noise. In use of the tire however, there is a further substantial reduction in tire noise which is believed to be due to the noise baffles 13 interfacing with or reflecting back into the tire pattern, the noise levels coming from the central regions of the contact patch. Substantial reductions in tire tread noise have been seen in initial test tires.

Figure 4:
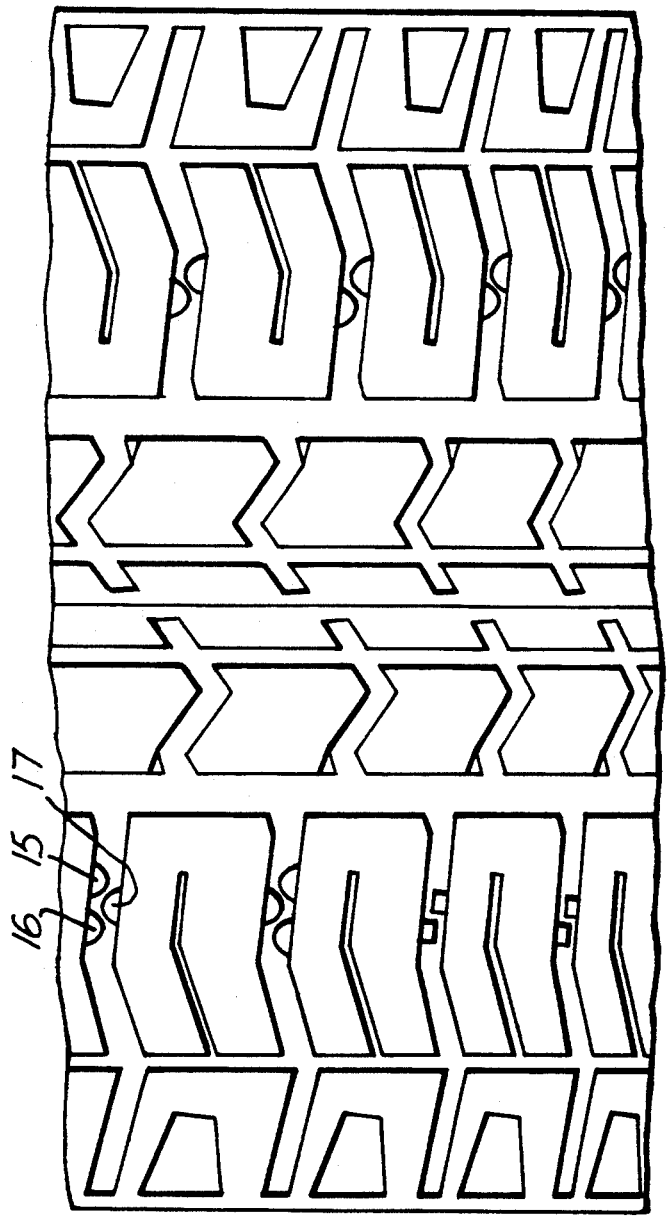
FIG. 4 is a plan view of a block pattern showing three further arrangements of noise baffles.

FIG. 4 shows three further embodiments. The top left hand embodiment use three interlocking noise baffles 15, 16 and 17. 15 and 16 being disposed on one side of the groove and 17 the other side. The interlocking leaves a water clearing path but does not leave a straight path and thus the interlocking baffles 15, 16 and 17 impede the noise moving along the groove.

The bottom left hand and right hand embodiments show alternative two baffle constructions.

The height of the noise baffles may vary between one quarter and three quarters of the depth of the groove d. The reason for the noise baffles being not the full height of the groove is to provide the necessary water drainage path for use of the new tire in wet conditions.

Figure 2:
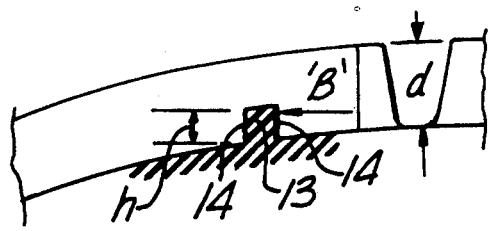
FIG. 2 is a section on line AA of FIG. 1.
Figure 3:
FIG. 3 is a sectional view in the direction of arrow B in FIG. 2.

The edge surfaces 14 of the ribs FIG. 2. may be formed in other directions to the radial direction with advantageous effect on noise retention but the preferred radial direction is one which is easily moulded in a conventional tire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:

1. A tire having a tread pattern comprising a central zone and two edge zones, said edge zones being subdivided circumferentially of the tire by a series of transverse grooves each having an axially outer end open to the tread edge, a plurality of noise baffles extending into each of said transverse grooves from opposite sidewalls thereof to interlock such that there is no straight path therethrough, said noise baffles extending from the base of the groove to a height of 25% to 75% of the groove depth and positioned at a distance of 2 to 25% of the tread width from the edge of the tread.

2. The tire according to claim 1 wherein the noise baffles have a width measured axially of the tire of 3 to 10 mm.

3. The tire according to claim 1 wherein the noise baffles have a width measured axially of the tire of 3 to 5 mm.

4. The tire according to claim 1 wherein the pattern comprises a block pattern in both the central zone and the edge regions.

* * * * *